(12) United States Patent
Sachsenmaier et al.

(10) Patent No.: US 7,686,149 B2
(45) Date of Patent: *Mar. 30, 2010

(54) POWER TRANSMISSION DEVICE WITH FRICTION CLUTCH AND POWER-OPERATED CLUTCH ACTUATOR

(75) Inventors: Helmuth Sachsenmaier, Denggasse (AT); Todd Ekonen, Howell, MI (US)

(73) Assignee: Magna Powertrain USA, Inc., Troy, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/434,228

(22) Filed: May 1, 2009

(65) Prior Publication Data

US 2009/0211869 A1    Aug. 27, 2009

Related U.S. Application Data

(63) Continuation of application No. 11/489,218, filed on Jul. 19, 2006, now Pat. No. 7,527,133.

(60) Provisional application No. 60/703,282, filed on Jul. 28, 2005.

(51) Int. Cl.
*B60K 23/08* (2006.01)
*B60K 17/35* (2006.01)

(52) U.S. Cl. .................. 192/84.6; 192/70.23; 192/84.7; 192/93 A; 180/249

(58) Field of Classification Search .................. 192/84.6
See application file for complete search history.

(56) References Cited

U.S. PATENT DOCUMENTS

| 4,805,486 A | 2/1989 | Hagiwara et al. |
| 4,862,769 A | 9/1989 | Koga et al. |
| 4,895,236 A | 1/1990 | Sakakibara et al. |
| 4,976,347 A | 12/1990 | Sakakibara et al. |
| 5,007,886 A | 4/1991 | Holmquist et al. |
| 5,080,640 A | 1/1992 | Botterill |
| 5,119,298 A | 6/1992 | Naito |
| 5,224,906 A | 7/1993 | Sturm |
| 5,323,871 A | 6/1994 | Wilson et al. |
| 5,407,024 A | 4/1995 | Watson et al. |
| 5,423,235 A | 6/1995 | Botterill et al. |
| 6,158,561 A | 12/2000 | Sakai et al. |
| 6,283,887 B1 | 9/2001 | Brown et al. |
| 6,398,686 B1 | 6/2002 | Irwin |
| 6,478,708 B2 | 11/2002 | Krisher |
| 6,484,857 B2 | 11/2002 | Vonnegut et al. |
| 6,520,880 B1 | 2/2003 | Fukushima et al. |
| 6,561,939 B1 | 5/2003 | Knapke |
| 6,595,338 B2 | 7/2003 | Bansbach et al. |

(Continued)

FOREIGN PATENT DOCUMENTS

DE    3908478 A1    10/1989

(Continued)

*Primary Examiner*—Richard M. Lorence
(74) *Attorney, Agent, or Firm*—Harness, Dickey & Pierce, P.L.C.

(57) ABSTRACT

A torque transfer mechanism is provided for controlling the magnitude of a clutch engagement force exerted on a multi-plate clutch assembly that is operably disposed between a first rotary and a second rotary member. The torque transfer mechanism includes a power-operated face gear clutch actuator for generating and applying a clutch engagement force on the clutch assembly.

35 Claims, 13 Drawing Sheets

U.S. PATENT DOCUMENTS

| | | | |
|---|---|---|---|
| 6,641,267 B2 | 11/2003 | Ohishi et al. | |
| 6,645,109 B2 | 11/2003 | Williams et al. | |
| 6,651,793 B2 | 11/2003 | Reisinger | |
| 6,659,250 B2 | 12/2003 | Nestler et al. | |
| 6,676,555 B2 | 1/2004 | Duan | |
| 6,691,845 B2 | 2/2004 | Showalter | |
| 6,766,889 B1 | 7/2004 | Pennycuff | |
| 6,802,794 B2 | 10/2004 | Showalter | |
| 6,808,037 B1 | 10/2004 | Mueller | |
| 6,808,052 B2 | 10/2004 | Kirkwood et al. | |
| 6,886,679 B2 | 5/2005 | Katsnelson et al. | |
| 6,951,521 B2 | 10/2005 | Hakui | |
| 6,966,863 B2 | 11/2005 | Teraoka et al. | |
| 6,988,604 B2 | 1/2006 | Kelley, Jr. | |
| 7,111,716 B2 | 9/2006 | Ekonen et al. | |
| 7,216,751 B2 | 5/2007 | Teraoka | |
| 7,527,133 B2 * | 5/2009 | Sachsenmaier et al. | 192/84.6 |
| 2004/0163916 A1 | 8/2004 | Showalter | |

FOREIGN PATENT DOCUMENTS

| | | |
|---|---|---|
| DE | 10033482 | 10/2001 |
| EP | 0368140 | 5/1990 |
| JP | 3066927 | 3/1991 |
| JP | 6218117 | 8/1994 |

* cited by examiner

POWER TRANSMISSION DEVICE WITH FRICTION CLUTCH AND POWER-OPERATED CLUTCH ACTUATOR

CROSS REFERENCE

This application is a continuation of U.S. patent application Ser. No. 11/489,218 filed on Jul. 19, 2006, now U.S. Pat. No. 7,527,133, which claims the benefit of U.S. Provisional Application Ser. No. 60/703,282 filed Jul. 28, 2005. The entire disclosures of each of the above applications are incorporated herein by reference.

FIELD OF THE INVENTION

The present invention relates generally to power transfer systems for controlling the distribution of drive torque between the front and rear drivelines of a four-wheel drive vehicle and/or the left and right wheel of an axle assembly. More particularly, the present invention is directed to a power transmission device for use in motor vehicle driveline applications having a torque transfer mechanism equipped with a power-operated clutch actuator that is operable for controlling actuation of a multi-plate friction clutch assembly.

BACKGROUND OF THE INVENTION

In view of increased demand for four-wheel drive vehicles, a plethora of power transfer systems are currently being developed for incorporation into vehicular driveline applications for transferring drive torque to the wheels. In many vehicles, a power transmission device is operably installed between the primary and secondary drivelines. Such power transmission devices are typically equipped with a torque transfer mechanism which is operable for selectively and/or automatically transferring drive torque from the primary driveline to the secondary driveline to establish a four-wheel drive mode of operation.

A modern trend in four-wheel drive motor vehicles is to equip the power transmission device with a transfer clutch and an electronically-controlled traction control system. The transfer clutch is operable for automatically directing drive torque to the secondary wheels, without any input or action on the part of the vehicle operator, when traction is lost at the primary wheels for establishing an "on-demand" four-wheel drive mode. Typically, the transfer clutch includes a multi-plate clutch assembly that is installed between the primary and secondary drivelines and a clutch actuator for generating a clutch engagement force that is applied to the clutch plate assembly. The clutch actuator typically includes a power-operated device that is actuated in response to electric control signals sent from an electronic controller unit (ECU). Variable control of the electric control signal is frequently based on changes in the current operating characteristics of the vehicle (i.e., vehicle speed, interaxle speed difference, acceleration, steering angle, etc.) as detected by various sensors. Thus, such "on-demand" power transmission devices can utilize adaptive control schemes for automatically controlling torque distribution during all types of driving and road conditions.

A large number of on-demand power transmission devices have been developed which utilize an electrically-controlled clutch actuator for regulating the amount of drive torque transferred through the clutch assembly to the secondary driveline as a function of the value of the electrical control signal applied thereto. In some applications, the transfer clutch employs an electromagnetic clutch as the power-operated clutch actuator. For example, U.S. Pat. No. 5,407,024 discloses a electromagnetic coil that is incrementally activated to control movement of a ball-ramp drive assembly for applying a clutch engagement force on the multi-plate clutch assembly. Likewise, Japanese Laid-open Patent Application No. 62-18117 discloses a transfer clutch equipped with an electromagnetic clutch actuator for directly controlling actuation of the multi-plate clutch pack assembly.

As an alternative, the transfer clutch may employ an electric motor and a drive assembly as the power-operated clutch actuator. For example, U.S. Pat. No. 5,323,871 discloses an on-demand transfer case having a transfer clutch equipped with an electric motor that controls rotation of a sector plate which, in turn, controls pivotal movement of a lever arm for applying the clutch engagement force to the multi-plate clutch assembly. Moreover, Japanese Laid-open Patent Application No. 63-66927 discloses a transfer clutch which uses an electric motor to rotate one cam plate of a ball-ramp operator for engaging the multi-plate clutch assembly. Finally, U.S. Pat. Nos. 4,895,236 and 5,423,235 respectively disclose a transfer case equipped with a transfer clutch having an electric motor driving a reduction gearset for controlling movement of a ball screw operator and a ball-ramp operator which, in turn, apply the clutch engagement force to the clutch pack.

While many on-demand clutch control systems similar to those described above are currently used in four-wheel drive vehicles, a need exists to advance the technology and address recognized system limitations. For example, the size and weight of the friction clutch components and the electrical power and actuation time requirements for the clutch actuator that are needed to provide the large clutch engagement loads may make such a system cost prohibitive in some motor vehicle applications. In an effort to address these concerns, new technologies are being considered for use in power-operated clutch actuator applications.

SUMMARY OF THE INVENTION

Thus, its is an object of the present invention to provide a power transmission device for use in a motor vehicle having a torque transfer mechanism equipped with a power-operated clutch actuator that is operable to control engagement of a multi-plate clutch assembly.

As a related object, the torque transfer mechanism of the present invention is well-suited for use in motor vehicle driveline applications to control the transfer of drive torque between a first rotary member and a second rotary member.

According to one preferred embodiment, a transfer unit is provided for use in a four-wheel drive motor vehicle having a powertrain and a driveline. The transfer unit includes a first shaft driven by the powertrain, a second shaft adapted for connection to the driveline and a torque transfer mechanism. The torque transfer mechanism includes a friction clutch assembly operably disposed between the first shaft and the second shaft and a clutch actuator assembly for generating and applying a clutch engagement force to the friction clutch assembly. The clutch actuator assembly includes an electric motor, a geared drive unit and a clutch apply operator. The electric motor drives the geared drive unit which, in turn, controls the direction and amount of rotation of a first cam member relative to a second cam member associated with the clutch apply operator. The cam members support rollers which ride against at least one tapered or ramped cam surface. The contour of the cam surface causes one of the cam members to move axially for causing corresponding translation of a thrust member. The thrust member applies the thrust force generated by the cam members as a clutch engagement force that is exerted on the friction clutch assembly. A control system including vehicle sensors and a controller are provided to control actuation of the electric motor.

In accordance with the present invention, the transfer unit is configured as a torque coupling for use in adaptively controlling the transfer of drive torque from the powertrain to the rear drive axle of an all-wheel drive vehicle. Pursuant to related embodiments, the transfer unit can be a transfer case for use in adaptively controlling the transfer of drive torque to the front driveline in an on-demand four-wheel drive vehicle or between the front and rear drivelines in a full-time four-wheel drive vehicle.

BRIEF DESCRIPTION OF THE DRAWINGS

Further objects, features and advantages of the present invention will become apparent to those skilled in the art from analysis of the following written description, the appended claims, and accompanying drawings in which:

DETAILED DESCRIPTION OF THE PREFERRED EMBODIMENTS

The present invention is directed to a torque transfer mechanism that can be adaptively controlled for modulating the torque transferred between a first rotary member and a second rotary member. The torque transfer mechanism finds particular application in power transmission devices for use in motor vehicle drivelines such as, for example, an on-demand transfer clutch in a transfer case or an in-line torque coupling or a biasing clutch associated with a differential unit in a transfer case or a drive axle assembly. Thus, while the present invention is hereinafter described in association with particular arrangements for use in specific driveline applications, it will be understood that the arrangements shown and described are merely intended to illustrate embodiments of the present invention.

Figure 1:
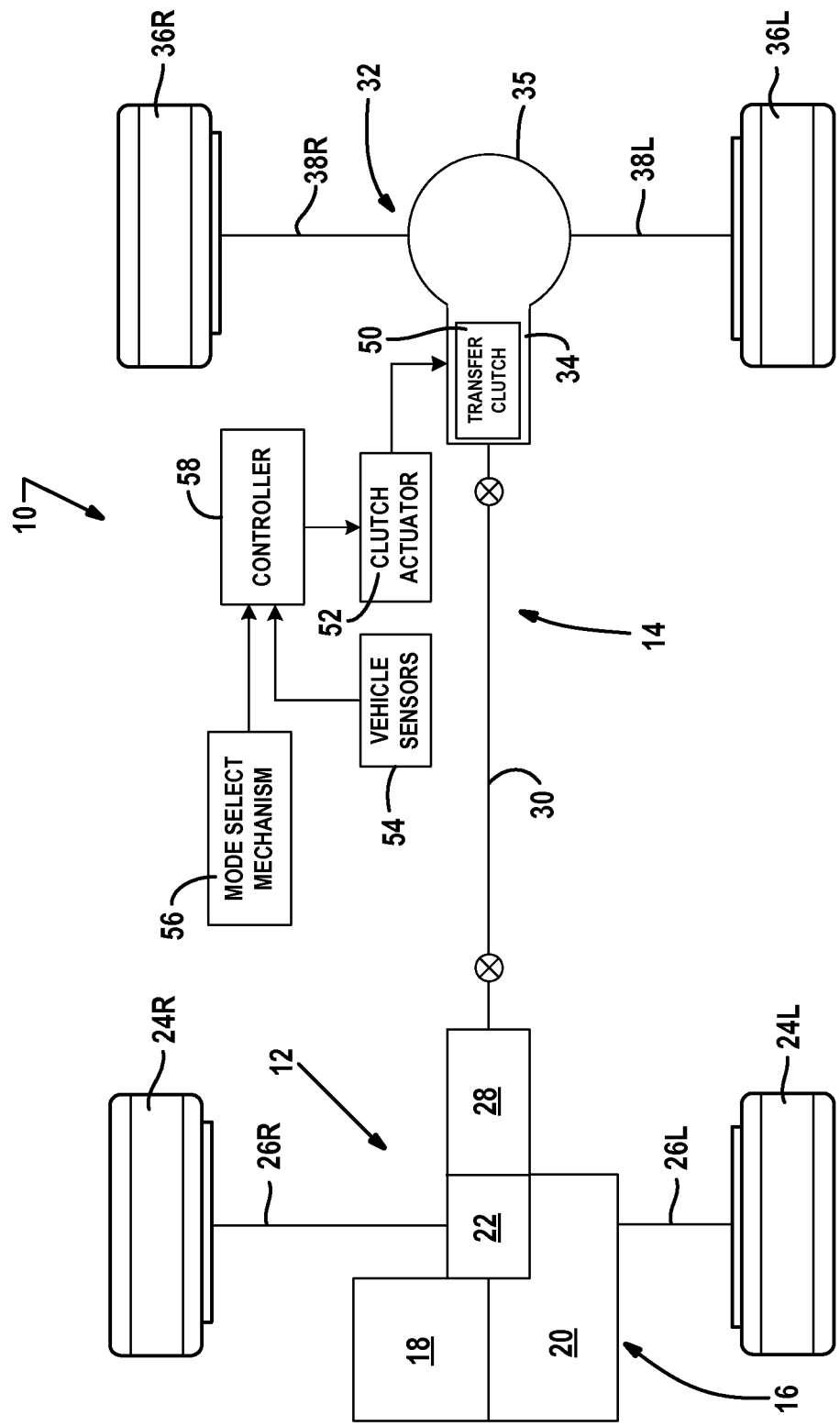
FIG. 1 illustrates the drivetrain of an all-wheel drive motor vehicle equipped with a power transmission device of the present invention.

With particular reference to FIG. 1 of the drawings, a drivetrain 10 for an all-wheel drive vehicle is shown. Drivetrain 10 includes a first or primary driveline 12, a second or secondary driveline 14 and a powertrain 16 for delivering rotary tractive power (i.e., drive torque) to the drivelines. In the particular arrangement shown, primary driveline 12 is the front driveline while secondary driveline 14 is the rear driveline. Powertrain 16 is shown to include an engine 18 and a multi-speed transmission 20. Front driveline 12 includes a front differential 22 driven by powertrain 16 for transmitting drive torque to a pair of front wheels 24L and 24R through a pair of front axleshafts 26L and 26R, respectively. Rear driveline 14 includes a power transfer unit 28 driven by powertrain 16 or front differential 22, a propshaft 30 driven by power transfer unit 28, a rear axle assembly 32 and a power transmission device 34 for selectively transferring drive torque from propshaft 30 to rear axle assembly 32. Rear axle assembly 32 is shown to include a rear differential 35, a pair of rear wheels 36L and 36R and a pair of rear axleshafts 38L and 38R that interconnect rear differential 35 to corresponding rear wheels 36L and 36R.

With continued reference to the drawings, drivetrain 10 is shown to further include an electronically-controlled power transfer system for permitting a vehicle operator to select a locked ("part-time") four-wheel drive mode, and an adaptive ("on-demand") four-wheel drive mode. In this regard, power transmission device 34 is equipped with a transfer clutch 50 that can be selectively actuated for transferring drive torque from propshaft 30 to rear axle assembly 32 for establishing the part-time and on-demand four-wheel drive modes. The power transfer system further includes a power-operated clutch actuator 52 for actuating transfer clutch 50, vehicle sensors 54 for detecting certain dynamic and operational characteristics of motor vehicle 10, a mode select mechanism 56 for permitting the vehicle operator to select one of the available drive modes and a controller 58 for controlling actuation of clutch actuator 52 in response to input signals from vehicle sensors 54 and mode selector 56.

Figure 2:
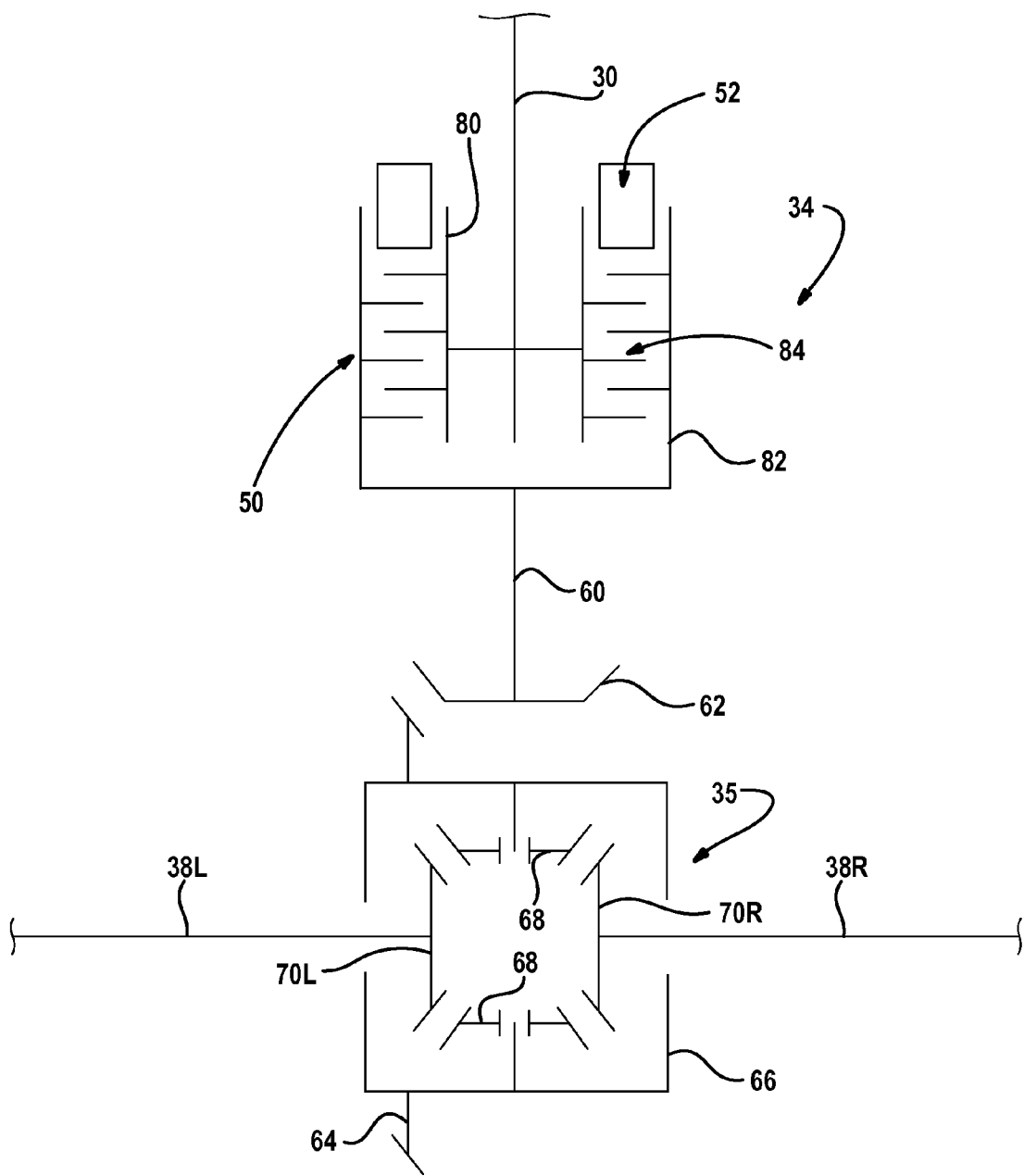
FIG. 2 is a schematic illustration of the power transmission device shown in FIG. 1 associated with a drive axle assembly.

Power transmission device, hereinafter referred to as torque coupling 34, is shown schematically in FIG. 2 to be operably disposed between propshaft 30 and a pinion shaft 60. As seen, pinion shaft 60 includes a pinion gear 62 that is meshed with a hypoid ring gear 64 fixed to a differential case 66 of rear differential 34. Differential 34 is conventional in that pinions 68 driven by case 66 are arranged to drive side gears 70L and 70R which are fixed for rotation with corresponding axleshafts 38L and 38R. Torque coupling 34 is shown to include transfer clutch 50 and clutch actuator 52 arranged to control the transfer of drive torque from propshaft 30 to pinion shaft 60 and which together define the torque transfer mechanism of the present invention.

Figure 3:
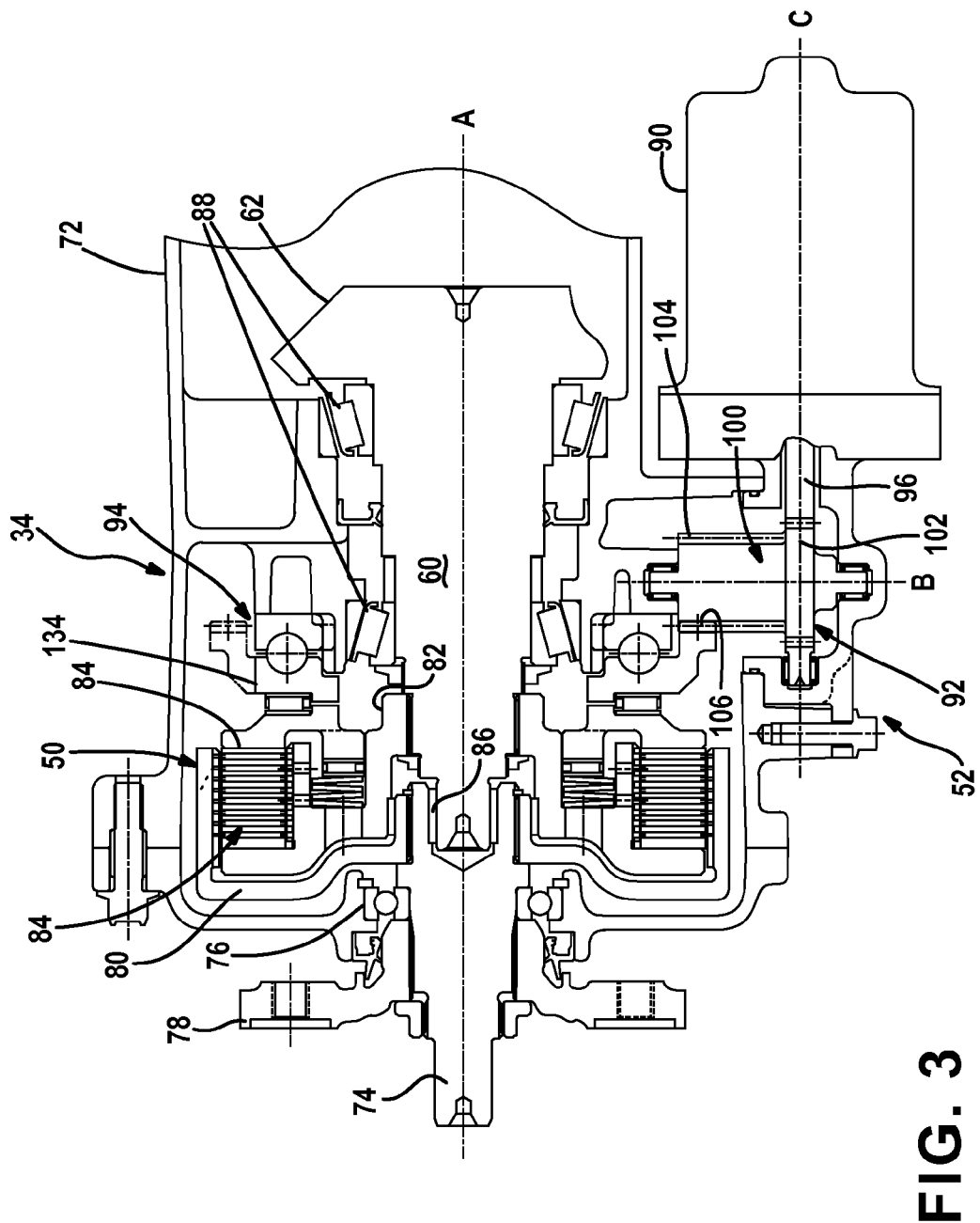
FIG. 3 is a partial sectional view of the power transmission device which is equipped with a friction clutch and a clutch actuator assembly according to the present invention.
Figure 4:
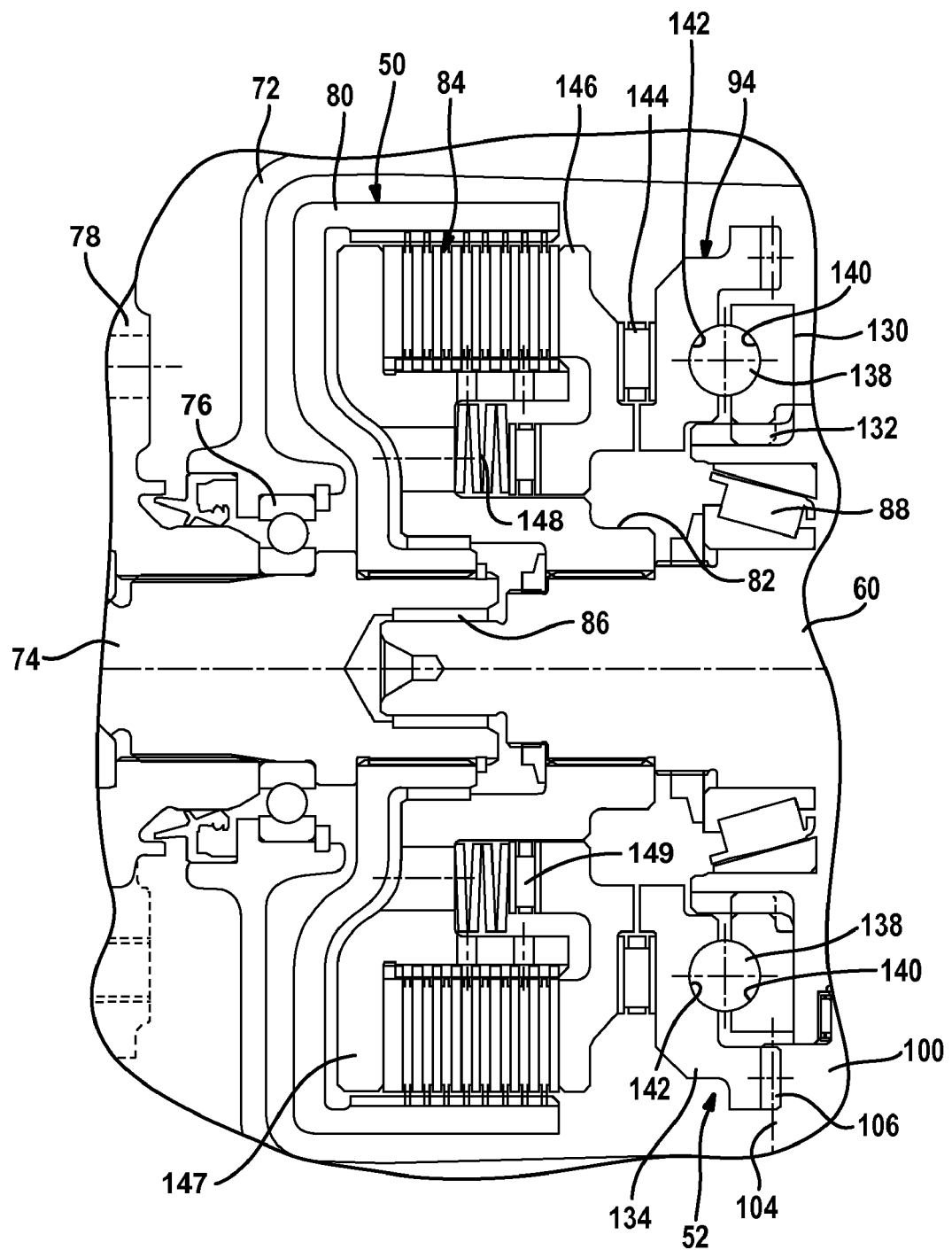
FIG. 4 is an enlarged partial view of the power transmission device taken from FIG. 3.

Referring primarily to FIGS. 3 and 4, the components and function of torque coupling 34 will be disclosed in detail. As seen, torque coupling 34 generally includes a housing 72, an input shaft 74 rotatably supported in housing 72 via a bearing assembly 76, transfer clutch 50 and clutch actuator 52. A yoke 78 is fixed to a first end of input shaft 74 to permit connection with propshaft 30. Transfer clutch 50 includes a drum 80 fixed (i.e., splined) for rotation with input shaft 74, a hub 82 fixed (i.e., splined) for rotation with pinion shaft 60, and a multi-plate clutch pack 84 comprised of alternating inner and outer clutch plates that are disposed between drum 80 and hub 82. As shown, a bearing assembly 86 rotatably supports a second end of input shaft 74 on a piloted end portion of pinion shaft 60, which, in turn, is rotatably supported in housing 72 via a pair of bearing assemblies 88.

Clutch actuator 52 is generally shown to include an electric motor 90, a geared drive unit 92 and a clutch apply operator 94. Electric motor 90 is secured to housing 72 and includes a rotary output shaft 96. Geared drive unit 92 is driven by motor output shaft 96 and functions to control relative movement between components of clutch apply operator 94 for controlling the magnitude of a clutch engagement force applied to clutch pack 84 of transfer clutch 50. In addition, geared drive unit 92 includes first and second gearsets which provide a desired speed reduction between motor shaft 96 and a rotary component of clutch apply operator 94. Specifically, the first gearset includes a first gear 98 driven by motor shaft 96 that is meshed with second gear 102. Pursuant to one preferred embodiment, first gear 98 is a worm that is formed integrally on or fixed to motor shaft 96 while second gear 102 is a worm gear. Likewise, the second gearset includes a third gear 104 that is meshed with a fourth gear 106 associated with clutch apply operator 94. Preferably, third gear 104 is a pinion gear while fourth gear 106 is a helical face gear. To permit the first gearset to drive the second gearset, worm gear 102 is fixed to pinion gear 104 to define a compound gear 100 that is rotatable about an axis B. It is contemplated that alternative planetary gear arrangements could be used in geared drive unit 92 instead of the worm gearing.

Clutch apply operator 94 is best shown in FIG. 4 to include a first cam plate 130 non-rotatably fixed via a spline connection 132 to housing 72, a second cam plate 134 that is rotatable about pinion shaft 60 and the axis A, and balls 138. As seen, face gear 106 of geared drive unit 92 is fixed to second cam plate 134. In addition, a ball 138 is disposed in each of a plurality of aligned cam grooves 140 and 142 formed in corresponding facing surfaces of first and second cam plates 130 and 134, respectively. Preferably, three equally-spaced sets of such facing cam grooves 140 and 142 are formed in cam plates 130 and 134, respectively. Grooves 140 and 142 are formed as cam surfaces that are ramped, tapered or otherwise contoured in a circumferential direction. Balls 138 roll against cam surfaces 140 and 142 so as to cause axial movement of second cam plate 134 relative to first cam plate 130 along the axis A.

A first thrust bearing assembly 144 is disposed between second cam plate 130 and an actuator plate 146 of clutch pack 84. As seen, hub 82 includes a reaction ring 147 with clutch pack 84 located between reaction ring 147 and actuator plate 146. A return spring 148 and a second thrust bearing assembly 149 are disposed between hub 82 and actuator plate 146. As an alternative to the arrangement shown, one of cam surfaces 140 and 142 can be non-tapered such that the ramping profile is configured entirely within the other of the cam surfaces. Also, balls 138 are shown be spherical but are contemplated to permit use of cylindrical rollers disposed in correspondingly shaped cam grooves or surfaces.

Second cam plate 134 is axially moveable relative to clutch pack 84 between a first or "released" position and a second or "locked" position. With second cam plate 134 in its released position, a minimum clutch engagement force is exerted by actuator plate 146 on clutch pack 84 such that virtually no drive torque is transferred from input shaft 74 through clutch pack 84 to pinion shaft 60. In this manner, a two-wheel drive mode is established. Return spring 148 is provided to normally bias second cam plate 132 toward its released position. In contrast, location of second cam plate 134 in its locked position causes a maximum clutch engagement force to be applied by actuator plate 146 to clutch pack 84 such that pinion shaft 60 is, in effect, coupled for common rotation with input shaft 74. In this manner, the locked or part-time four-wheel drive mode is established. Therefore, accurate bi-directional control of the axial position of second cam plate 134 between its released and locked positions permits adaptive regulation of the amount of drive torque transferred from input shaft 74 to pinion shaft 60, thereby establishing the on-demand four-wheel drive mode.

The tapered contour of cam surfaces 140 and 142 is selected to control the axial translation of second cam plate 134 relative to clutch pack 84 from its released position to its locked position in response to worm 98 being driven by motor 90 in a first rotary direction. Such rotation of worm 98 in a first direction induces rotation of compound gear 100 about axis B, which causes face gear 106 to rotate second cam plate 134 about axis A in a first direction. As a result, corresponding relative rotation between cam plates 130 and 134 occurs such that balls 138 ride against contoured cam surfaces 140 and 142. However, since first cam plate 130 is restrained against axial and rotational movement, such rotation of second cam plate 134 causes concurrent axial movement of second cam plate 134 toward its locked position for increasing the clutch engagement force on clutch pack 84.

Figure 5:
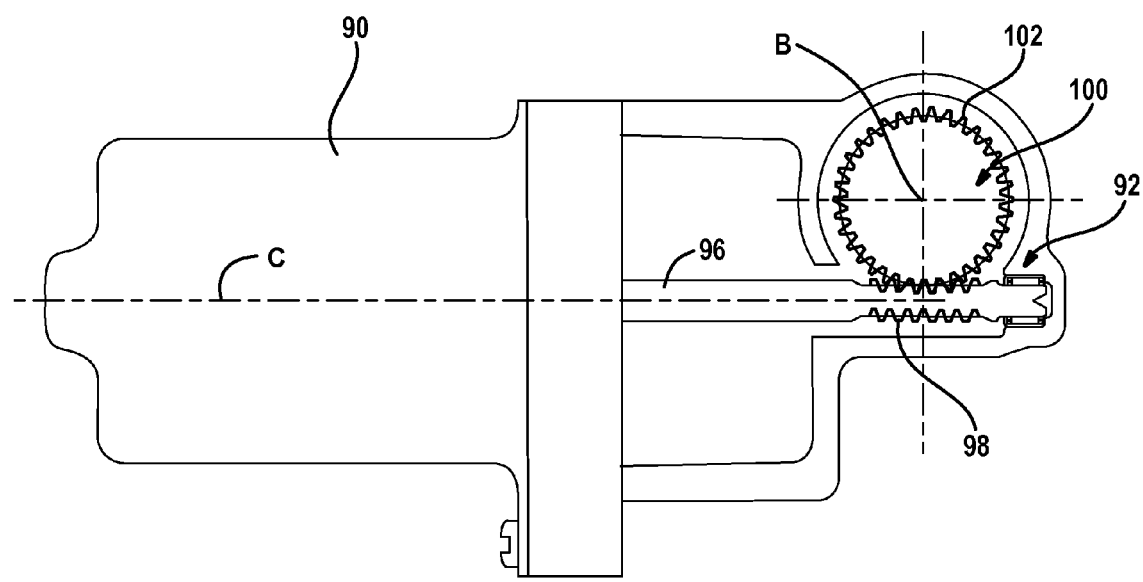
FIGS. 5 and 6 are detailed views of components of a geared drive unit associated with the clutch actuator assembly.
Figure 6:
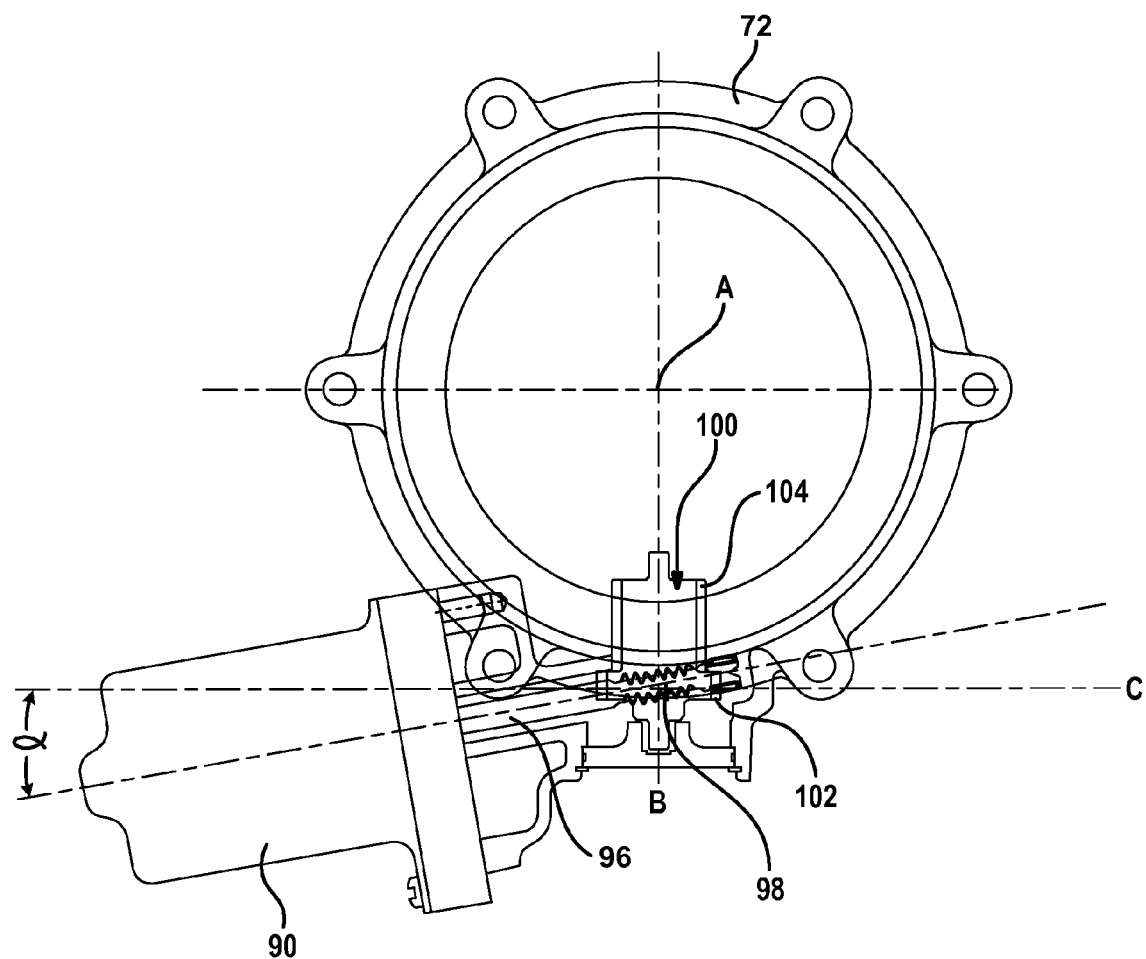

Referring now primarily to FIGS. 3, 5 and 6, clutch actuator 52 can be positioned to account for in-vehicle packaging requirements. For example, as illustrated in FIGS. 3 and 5, the rotary axis "C" of shaft 96 of electric motor 90 is aligned parallel to axis A extending along power transmission device 34 and is also perpendicular to axis B. As illustrated in FIG. 6, electric motor 90 is perpendicular to axis A, extending from power transmission device 34. Further, electric motor 90 can be angularly positioned at an angle $\alpha$ relative to a horizontal axis C of power transmission device 34 to further accommodate in-vehicle packaging requirements.

Figure 7:
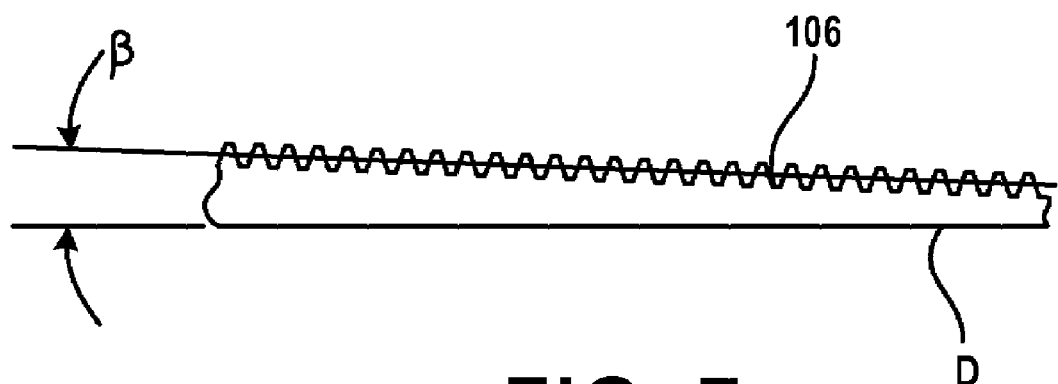
FIG. 7 is a partial side view of a face gear of a ball-ramp actuator component of the clutch actuator assembly according to the present invention.
Figure 8:
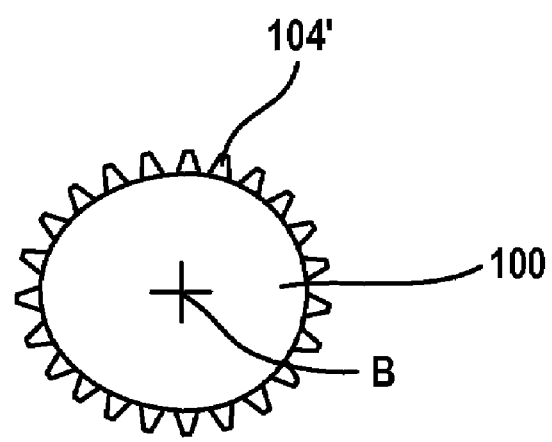
FIG. 8 is a cross-sectional view of an alternative pinion gear of the clutch actuator assembly according to the present invention.

Referring to FIGS. 7 and 8, the interface between the teeth of pinion gear 104 and face gear 106 will be described in further detail. In one embodiment (FIG. 7), face gear 106 includes a ramp or helix angle $\beta$, whereby its helical teeth steadily increase in elevation relative to a plane D. Ramp angle $\beta$ corresponds to the ramp or taper angle of contoured cam surfaces 140 and 142, thereby compensating for axial movement of second cam plate 134 away from pinion gear 104 along axis A. In this manner, pinion gear 104 and face gear 106 remain in meshed engagement as clutch apply operator 94 acts on transfer clutch 50. In another embodiment (FIG. 8), pinion gear 104' includes an oblong cross-section, whereby its teeth are at varying distances from rotational axis B. The oblong cross-section compensates for movement of second cam plate 134 away from pinion gear 104' along axis A. In this manner, pinion gear 104' and face gear 106 remain in meshed engagement as clutch apply operator 94 acts on transfer clutch 50. It is anticipated that ramp angle $\beta$ and the oblong cross-section can be implemented individually or in concert to maintain meshed engagement of pinion gear 104' and face gear 106 as clutch apply operator 94 activates transfer clutch 50.

In operation, when mode selector 56 indicates selection of the two-wheel drive mode, controller 58 signals electric motor 90 to rotate motor shaft 96 in the second direction for moving second cam plate 134 until it is located in its released position, thereby releasing clutch pack 84. As noted, return spring 148 assists in returning second cam plate 134 to its released position. If mode selector 56 thereafter indicates selection of the part-time four-wheel drive mode, electric motor 90 is signaled by controller 58 to rotate motor 96 in the first direction for inducing axial translation of second cam plate 134 until it is located in its locked position. As noted, such axial movement of second cam plate 134 to its locked position acts to fully engage clutch pack 84, thereby coupling pinion shaft 60 to input shaft 74.

When mode selector 56 indicates selection of the on-demand four-wheel drive mode, controller 58 energizes electric motor 90 to rotate motor 96 until second cam plate 134 is axially located in a ready or "stand-by" position. This position may be its released position or, in the alternative, an intermediate position. In either case, a predetermined minimum amount of drive torque is delivered to pinion shaft 60 through clutch pack 84 in this stand-by condition. Thereafter, controller 58 determines when and how much drive torque needs to be transferred to pinion shaft 60 based on current tractive conditions and/or operating characteristics of the motor vehicle, as detected by sensors 54. As will be appreciated, any control schemes known in the art can be used with the present invention for adaptively controlling actuation of transfer clutch 50 in a driveline application. The arrangement described for clutch actuator 52 is an improvement over the prior art in that the torque amplification provided by geared drive unit 92 permits use of a small low-power electric motor and yet provides extremely quick response and precise control. Other advantages are realized in the reduced number of components and packaging flexibility.

Figure 9:
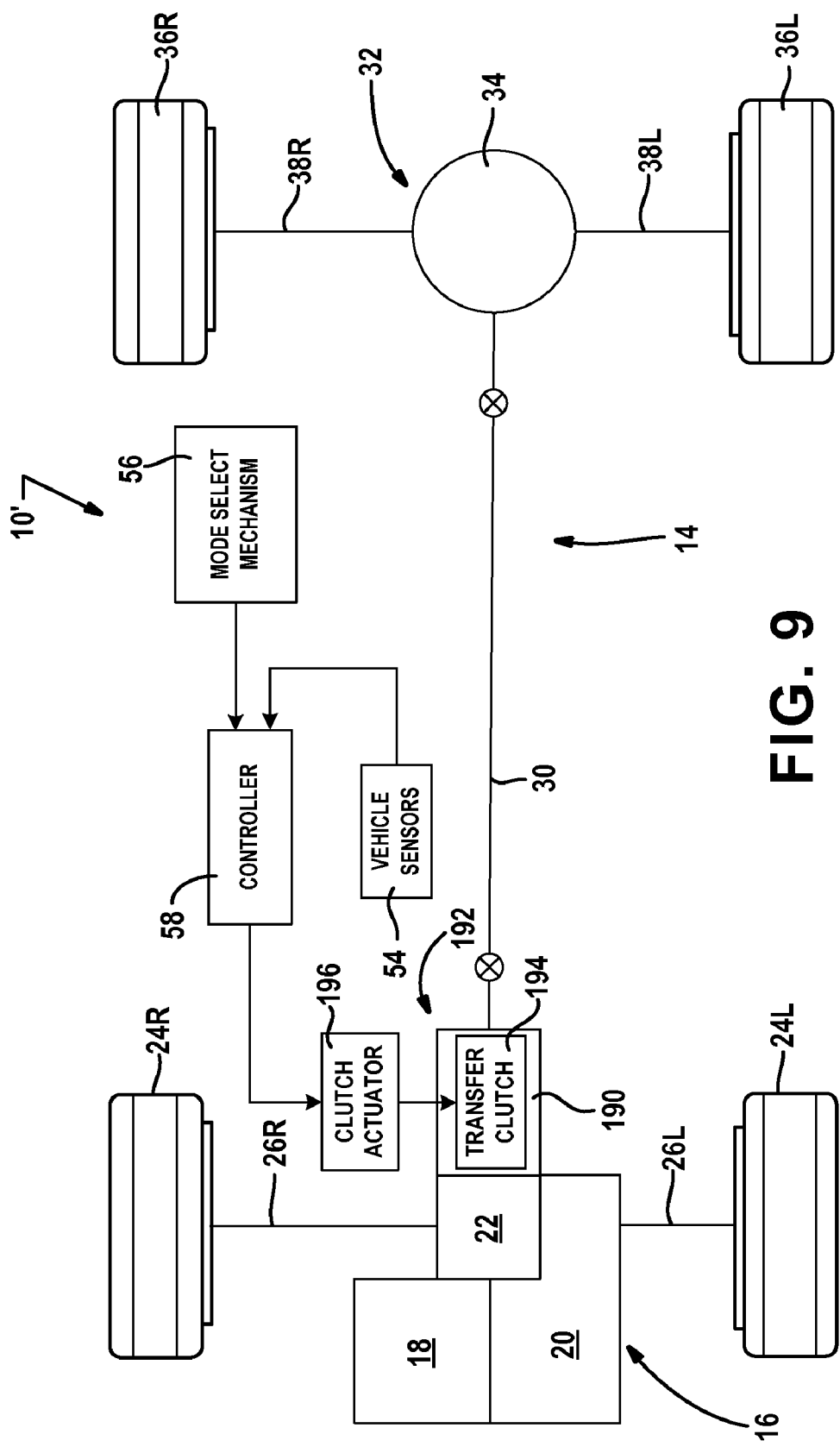
FIGS. 9-12 are schematic illustrations of alternative embodiments for the power transmission device of the present invention.

To illustrate an alternative power transmission device to which the present invention is applicable, FIG. 9 schematically depicts a front-wheel based four-wheel drivetrain layout 10' for a motor vehicle. In particular, engine 18 drives multi-speed transmission 20 having an integrated front differential unit 22 for driving front wheels 24L and 24R via axleshafts 26L and 26R. A power transfer unit 190 is also driven by powertrain 16 for delivering drive torque to the input member of a torque transfer mechanism, hereinafter referred to as torque coupling 192, that is operable for selectively transferring drive torque to propshaft 30. Accordingly, when sensors indicate the occurrence of a front wheel slip condition, controller 58 adaptively controls actuation of torque coupling 192 such that drive torque is delivered "on-demand" to rear driveline 14 for driving rear wheels 36L and 36R. It is contemplated that torque transfer coupling 192 would include a multi-plate clutch assembly 194 and a clutch actuator 196 that are generally similar in structure and function to multi-plate transfer clutch 50 and clutch actuator 52 previously described herein.

Figure 10:
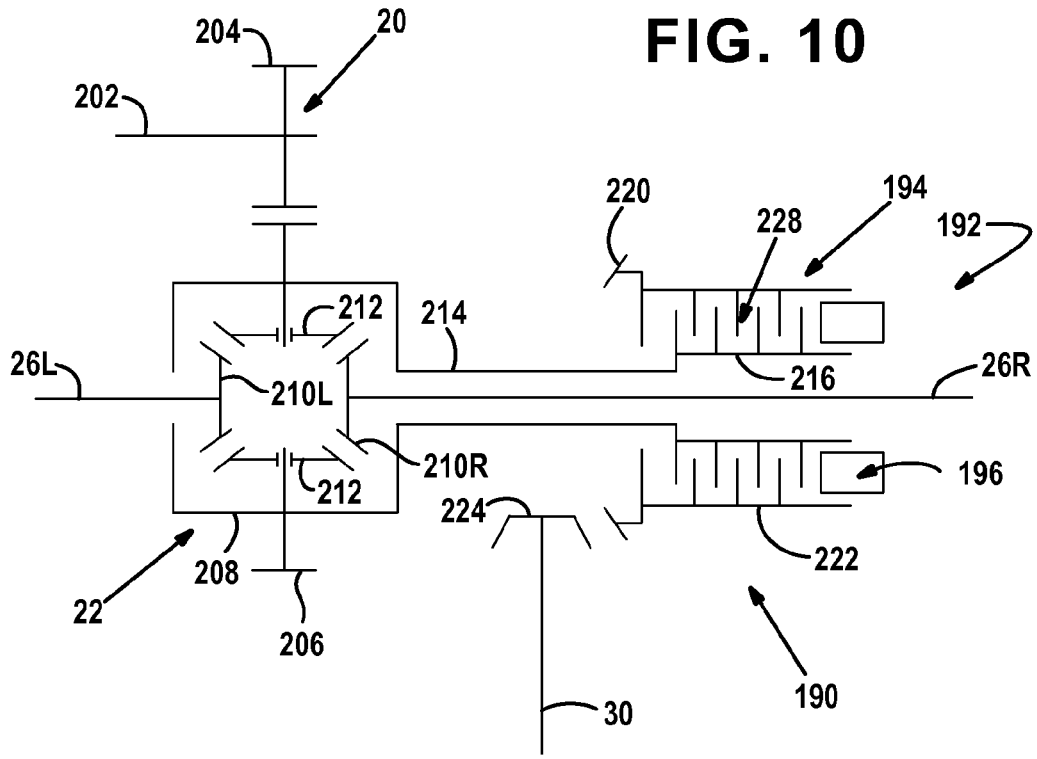

Referring now to FIG. 10, power transfer unit 190 is now schematically illustrated in association with an on-demand all-wheel drive system based on a front-wheel drive vehicle similar to that shown in FIG. 9. In particular, an output shaft 202 of transmission 20 is shown to drive an output gear 204 which, in turn, drives an input gear 206 fixed to a carrier 208 associated with front differential unit 22. To provide drive torque to front wheels 24L and 24R, front differential 22 further includes a pair of side gears 210L and 210R that are connected to the front wheels via corresponding axleshafts 26L and 26R. Differential unit 22 also includes pinions 212 that are rotatably supported on pinion shafts fixed to carrier 208 and which are meshed with both side gears 210L and 210R. A transfer shaft 214 is provided to transfer drive torque from carrier 208 to torque coupling 192.

Power transfer unit 190 includes a right-angled drive mechanism having a ring gear 220 fixed for rotation with a drum 222 of clutch assembly 194 and which is meshed with a pinion gear 224 fixed for rotation with propshaft 30. As seen, a clutch hub 216 of clutch assembly 194 is driven by transfer shaft 214 while a clutch pack 228 is disposed between hub 216 and drum 222. Clutch actuator assembly 196 is operable for controlling engagement of clutch assembly 194. Clutch actuator assembly 196 is intended to be similar to motor-driven clutch actuator assembly 52 previously described in that an electric motor is supplied with electric current for controlling relative rotation of a geared drive unit which, in turn, controls translational movement of a cam plate operator for controlling engagement of clutch pack 228.

In operation, drive torque is transferred from the primary (i.e., front) driveline to the secondary (i.e., rear) driveline in accordance with the particular mode selected by the vehicle operator via mode selector 56. For example, if the on-demand four-wheel drive mode is selected, controller 58 modulates actuation of clutch actuator assembly 196 in response to the vehicle operating conditions detected by sensors 54 by varying the value of the electric control signal sent to the electric motor. In this manner, the level of clutch engagement and the amount of drive torque that is transferred through clutch pack 228 to rear driveline 14 through power transfer unit 190 is adaptively controlled. Selection of the part-time four-wheel drive mode results in full engagement of clutch assembly 194 for rigidly coupling the front driveline to the rear driveline. In some applications, mode selector 56 may be eliminated such that only the on-demand four-wheel drive mode is available so as to continuously provide adaptive traction control without input from the vehicle operator.

Figure 11:
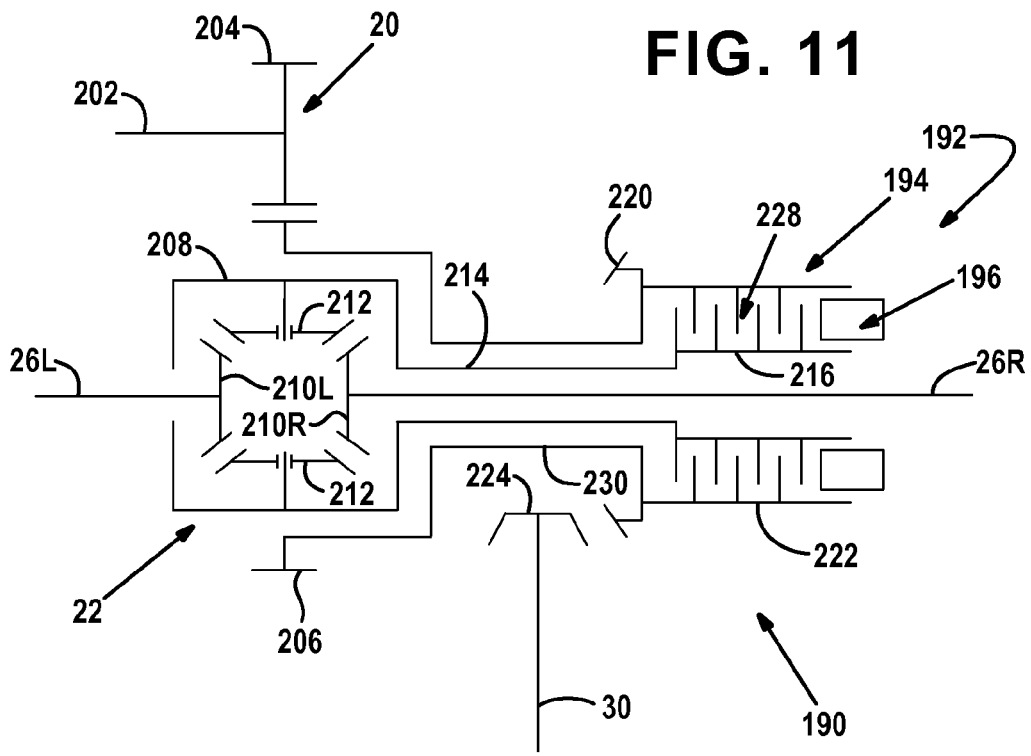

FIG. 11 illustrates a modified version of FIG. 10 wherein an on-demand four-wheel drive system is shown based on a rear-wheel drive motor vehicle that is arranged to normally deliver drive torque to rear driveline 14 while selectively transmitting drive torque to front wheels 24L and 24R through torque coupling 192. In this arrangement, drive torque is transmitted directly from transmission output shaft 202 to transfer unit 190 via a drive shaft 230 interconnecting input gear 206 to ring gear 220. To provide drive torque to the front wheels, torque coupling 192 is shown operably disposed between drive shaft 230 and transfer shaft 214. In particular, clutch assembly 194 is arranged such that drum 222 is driven with ring gear 220 by drive shaft 230. As such, actuation of clutch actuator 196 functions to transfer torque from drum 222 through clutch pack 228 to hub 216 which, in turn, drives carrier 208 of front differential unit 22 via transfer shaft 214. Again, the vehicle could be equipped with mode selector 56 to permit selection by the vehicle operator of either the adaptively controlled on-demand four-wheel drive mode or the locked part-time four-wheel drive mode. In vehicles without mode selector 56, the on-demand four-wheel drive mode is the only drive mode available and provides continuous adaptive traction control without input from the vehicle operator.

Figure 12:
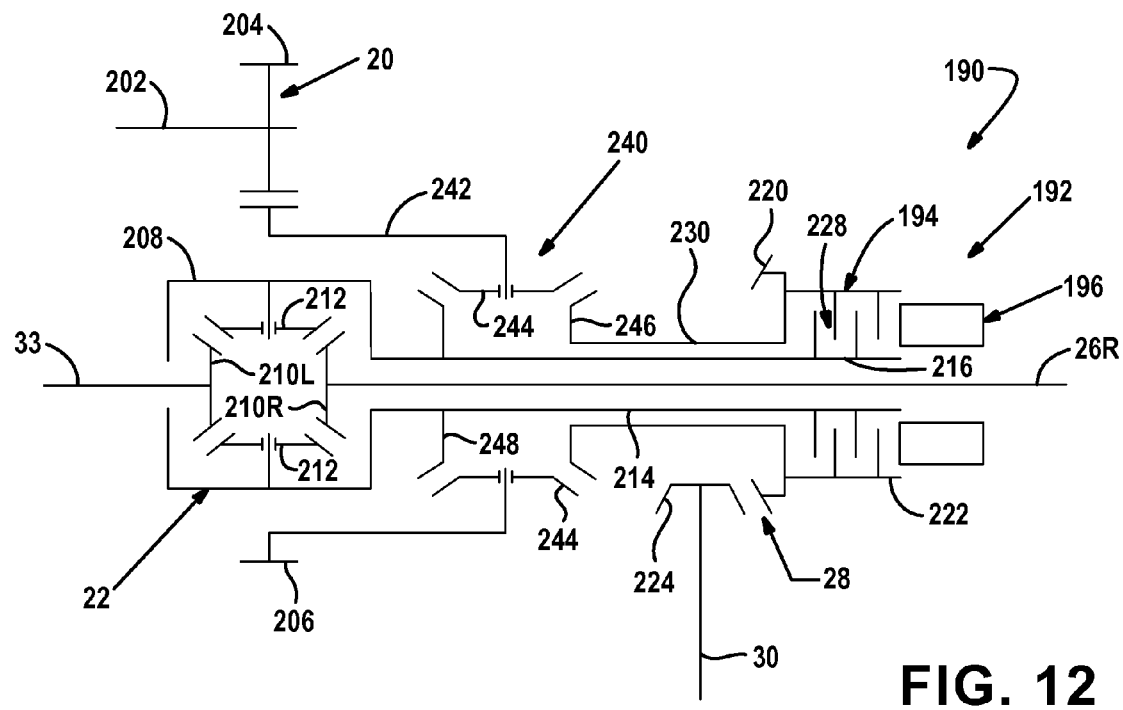

In addition to the on-demand 4WD systems shown previously, the power transmission technology of the present invention can likewise be used in full-time 4WD systems to adaptively bias the torque distribution transmitted by a center or "interaxle" differential unit to the front and rear drivelines. For example, FIG. 12 schematically illustrates a full-time four-wheel drive system which is generally similar to the on-demand four-wheel drive system shown in FIG. 10 with the exception that power transfer unit 190 now includes an interaxle differential unit 240 that is operably installed between carrier 208 of front differential unit 22 and transfer shaft 214. In particular, output gear 206 is fixed for rotation with a carrier 242 of interaxle differential 240 from which pinion gears 244 are rotatably supported. A first side gear 246 is meshed with pinion gears 244 and is fixed for rotation with drive shaft 230 so as to be drivingly interconnected to rear driveline 14 through transfer gearset 220 and 224. Likewise, a second side gear 248 is meshed with pinion gears 244 and is fixed for rotation with carrier 208 of front differential unit 22 so as to be drivingly interconnected to the front driveline.

Torque coupling 192 is now shown to be operably disposed between side gears 246 and 248. As such, torque coupling 192 is operably arranged between the driven outputs of interaxle differential 240 for providing a torque biasing and slip limiting function. Torque coupling 192 is shown to again include multi-plate clutch assembly 194 and clutch actuator assembly 196. Clutch assembly 194 is operably arranged between transfer shaft 214 and driveshaft 230. In operation, when sensor 54 detects a vehicle operating condition, such as excessive interaxle slip, controller 58 adaptively controls activation of the electric motor associated with clutch actuator assembly 196 for controlling engagement of clutch assembly 194 and thus the torque biasing between the front and rear drivelines.

Figure 13:
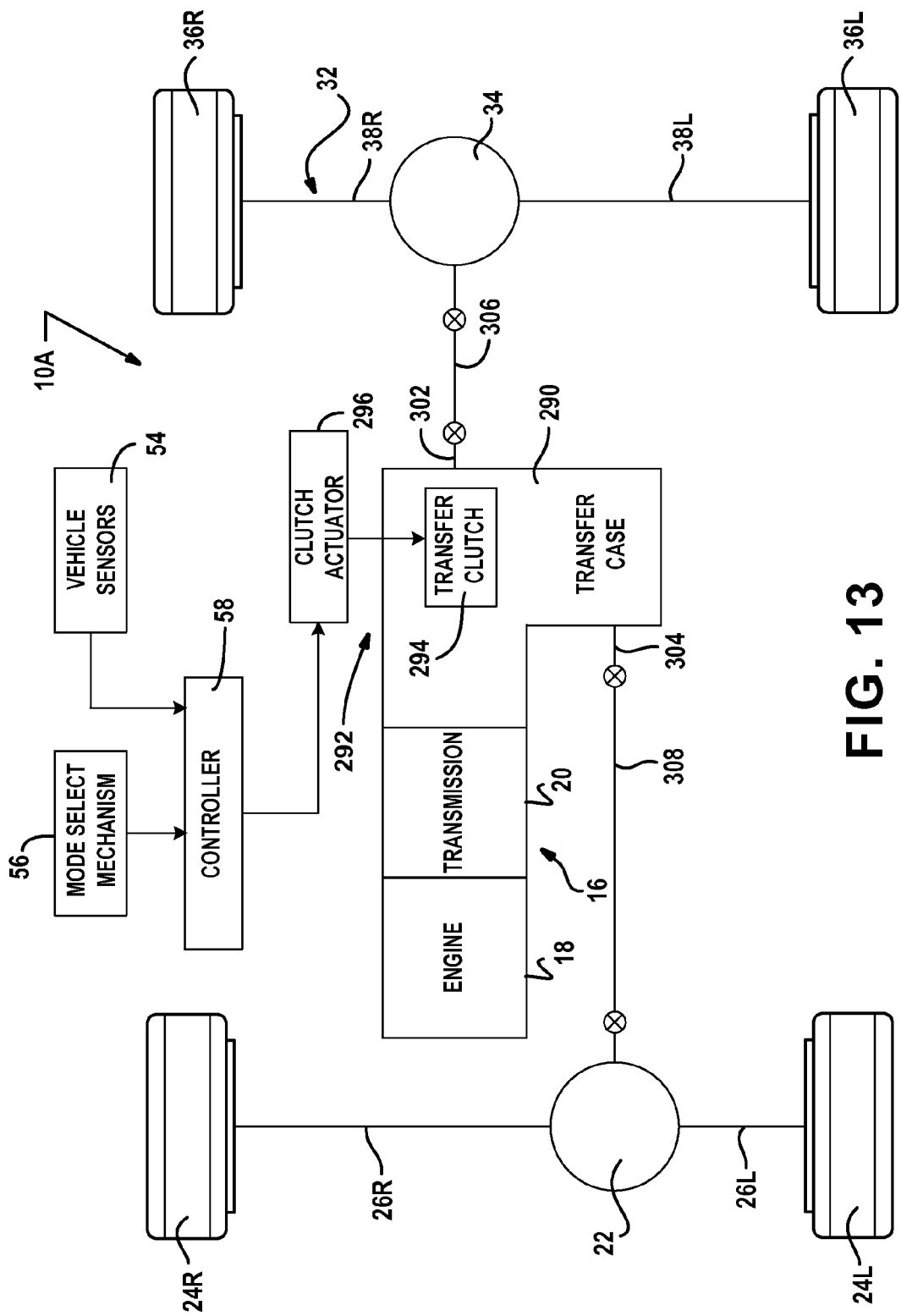
FIG. 13 illustrates the drivetrain of a four-wheel drive vehicle equipped with another version of the power transmission device of the present invention.

Referring now to FIG. 13, a schematic layout of a drivetrain 10A for a four-wheel drive vehicle having powertrain 16 delivering drive torque to a power transfer unit, hereinafter referred to as transfer case 290. Transfer case 290 includes a rear output shaft 302, a front output shaft 304 and a torque coupling 292 therebetween. Torque coupling 292 generally includes a multi-plate transfer clutch 294 and a power-operated clutch actuator 296. As seen, a rear propshaft 306 couples rear output shaft 302 to rear differential 34 while a front propshaft 308 couples front output shaft 304 to front differential 22. Power-operated clutch actuator 296 is again schematically shown to provide adaptive control over engagement of multi-plate clutch assembly 294 incorporated into transfer case 290.

Figure 14:
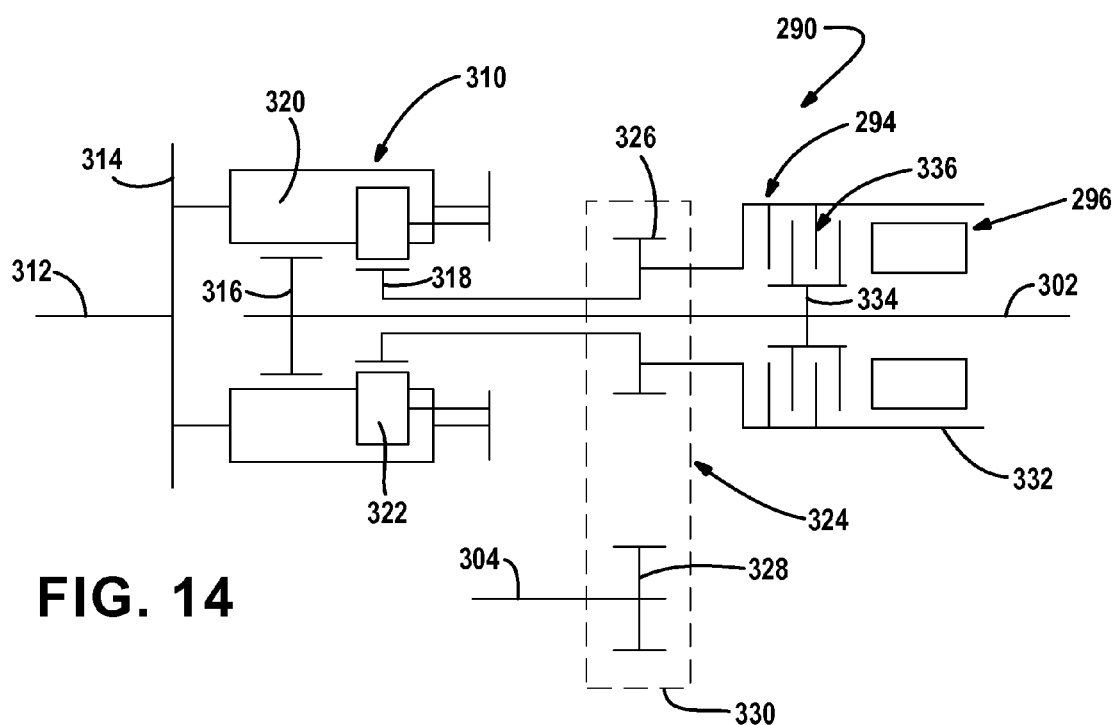
FIGS. 14 and 15 are schematic illustrations of transfer cases adapted for use with the drivetrain shown in FIG. 13.

Referring now to FIG. 14, a full-time 4WD system is shown to include transfer case 290 equipped with an interaxle differential 310 between an input shaft 312 and output shafts 302 and 304. Differential 310 includes an input defined as a planet carrier 314, a first output defined as a first sun gear 316, a second output defined as a second sun gear 318, and a gearset for permitting speed differentiation between first and second sun gears 316 and 318. The gearset includes meshed pairs of first planet gears 320 and second planet gears 322 which are rotatably supported by carrier 314. First planet gears 320 are shown to mesh with first sun gear 316 while second planet gears 322 are meshed with second sun gear 318. First sun gear 316 is fixed for rotation with rear output shaft 302 so as to transmit drive torque to the rear driveline. To transmit drive torque to the front driveline, second sun gear 318 is coupled to a transfer assembly 324 which includes a first sprocket 326 rotatably supported on rear output shaft 302, a second sprocket 328 fixed to front output shaft 304, and a power chain 330.

Figure 15:
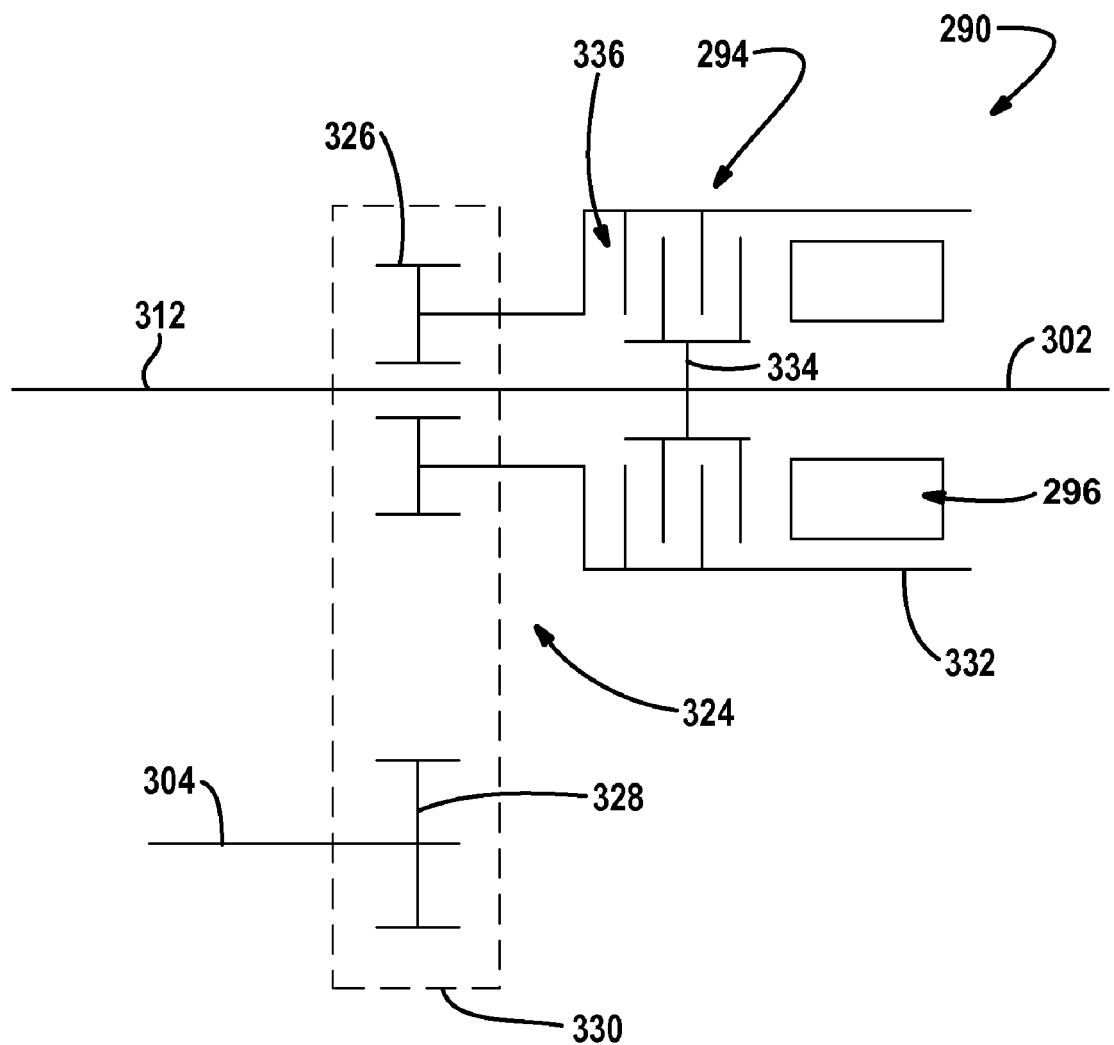

As noted, transfer case 290 includes clutch assembly 294 and clutch actuator 296. Clutch assembly 294 has a drum 332 fixed to sprocket 326 for rotation with front output shaft 304, a hub 334 fixed for rotation with rear output shaft 302 and a multi-plate clutch pack 336 therebetween. Again, clutch actuator 296 is schematically shown but intended to be substantially similar in structure and function to that disclosed in association with clutch actuator 52 shown in FIGS. 3 and 4. FIG. 15 is merely a modified version of transfer case 290 which is constructed without center differential 310 to provide an on-demand four-wheel drive system.

Figure 16:
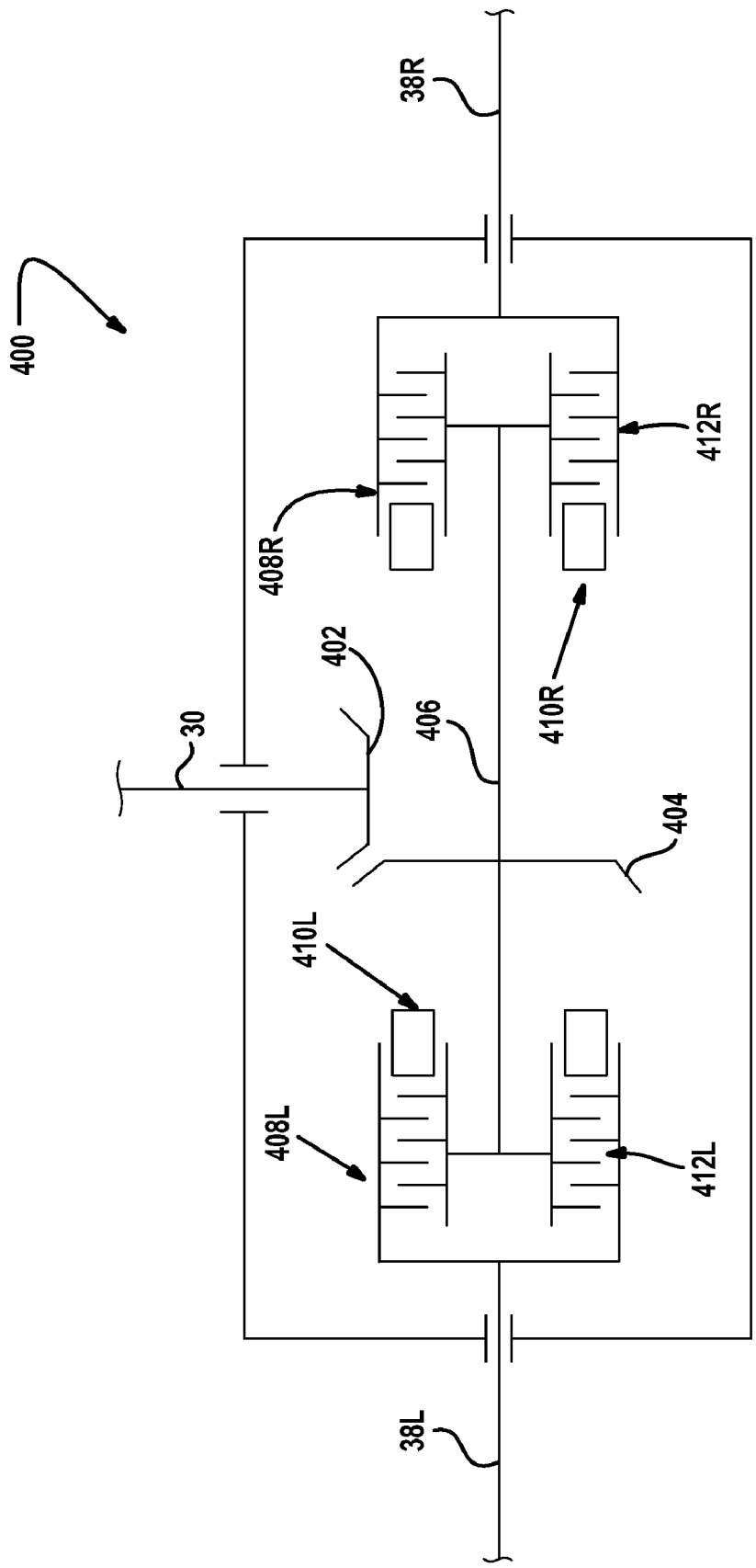
FIG. 16 is a schematic view of a power transmission device equipped with a torque vectoring distribution mechanism according to the present invention.

Referring now to FIG. 16, a drive axle assembly 400 is schematically shown to include a pair of torque couplings operably installed between driven propshaft 30 and rear axleshafts 38L and 38R. Propshaft 30 drives a right-angle gearset including pinion 402 and ring gear 404 which, in turn, drives a transfer shaft 406. A first torque coupling 408L is shown disposed between transfer shaft 406 and left axleshaft 38L while a second torque coupling 408R is disposed between transfer shaft 406 and right axleshaft 38R. Each of the torque couplings can be independently controlled via activation of its corresponding clutch actuator assembly 410L, 410R to adaptively control engagement of corresponding multi-plate clutch assemblies 412L and 412R for controlling side-to-side torque delivery. In a preferred application, axle assembly 400 can be used in association with the secondary driveline in four-wheel drive motor vehicles.

A number of preferred embodiments have been disclosed to provide those skilled in the art an understanding of the best mode currently contemplated for the operation and construction of the present invention. The invention being thus described, it will be obvious that various modifications can be made without departing from the true spirit and scope of the invention, and all such modifications as would be considered by those skilled in the art are intended to be included within the scope of the following claims.

What is claimed is:

1. A power transmission device, comprising:
a first rotary member adapted to receive drive torque from a power source;
a second rotary member adapted to provide drive torque to an output device;
a torque transfer mechanism operable for transferring drive torque from said first rotary member to said second rotary member and including a transfer clutch disposed between said first and second rotary members and a clutch actuator for controlling engagement of said transfer clutch, said clutch actuator including an electric motor driving a geared drive unit for converting rotary movement of a clutch apply operator into translational movement of an actuator plate relative to said transfer clutch, said geared drive unit including a pinion gear driven by said electric motor that is meshed with a face gear fixed to said clutch apply operator and having a ramp angle adapted to accommodate translational movement of said face gear relative to said pinion gear; and
a control system for actuating said electric motor to control the direction and amount of rotation of said face gear so as to concurrently control the direction and amount of translational movement of said actuator plate relative to said transfer clutch.

2. The power transmission device of claim 1 wherein said clutch apply operator includes a cam mechanism operable for converting rotation of said face gear into axial translation of said actuator plate.

3. The power transmission device of claim 2 wherein said cam mechanism includes first and second cam plates at least one of which is rotatable relative to the other so as to cause axial translation of said actuator plate.

4. The power transmission device of claim 3 wherein said first cam plate is fixed against rotation and said face gear is fixed for common rotation and axial movement with said second cam plate such that rotation of said face gear causes said second cam plate to axially translate said actuator plate.

5. The power transmission device of claim 4 wherein said second cam plate includes a ring segment having a face surface with helical gear teeth formed thereon to define said face gear, and wherein said face surface includes said ramp angle.

6. The power transmission device of claim 1 wherein said pinion gear includes an oblong cross-section sized to accommodate axial movement of said face gear relative to said pinion gear.

7. The power transmission device of claim 1 wherein said geared drive unit further includes a gearset between said pinion gear and a motor shaft driven by said electric motor.

8. The power transmission device of claim 7 wherein a rotational axis of said motor shaft is a perpendicular to a rotational axis of said pinion gear.

9. The power transmission device of claim 1 wherein said control system includes a controller for receiving input signals from a sensor and generating electric control signals based on said input signals which are supplied to said electric motor for controlling the direction and amount of rotary movement of said face gear.

10. The power transmission device of claim 1 wherein said first rotary member provides drive torque to a first driveline of a motor vehicle, and wherein said second rotary member is coupled to a second driveline of the motor vehicle.

11. The power transmission device of claim 10 defining a transfer case wherein said first rotary member is a first shaft driving said first driveline and said second rotary member is a second shaft coupled to said second driveline, wherein location of said actuator plate in a first position releases engagement of said transfer clutch so as to define a two-wheel drive mode and location of said actuator plate in a second position fully engages said transfer clutch so as to define a part-time four-wheel drive mode, and wherein said control system is operable to control activation of said electric motor for varying the position of said actuator plate between its first and second positions to controllably vary the drive torque transferred from said first shaft to said second shaft so as to define an on-demand four-wheel drive mode.

12. The power transmission device of claim 10 defining a power take-off unit wherein said first rotary member provides drive torque to a first differential associated with said first driveline, and wherein said second rotary member is coupled to a second differential associated with said second driveline.

13. The power transmission device of claim 1 wherein said first rotary member is a propshaft driven by a drivetrain of a motor vehicle and said second rotary member is a pinion shaft driving a differential associated with an axle assembly of said motor vehicle, and wherein said transfer clutch is disposed between said propshaft and said pinion shaft such that actuation of said clutch actuator is operable to transfer drive torque from said propshaft to said pinion shaft.

14. The power transmission device of claim 1 wherein said first rotary member includes a first differential supplying drive torque to a pair of first wheels in a motor vehicle and a transfer shaft driven by said differential, wherein said second rotary member includes a propshaft coupled to a second differential interconnecting a pair of second wheels in said motor vehicle, and wherein said transfer clutch is disposed between said transfer shaft and said propshaft.

15. The power transmission device of claim 1 wherein said first rotary member includes a first shaft supplying drive torque to a second shaft which is coupled to a first differential for driving a pair of first wheels in a motor vehicle, wherein said second rotary member is a third shaft driving a second differential interconnecting a pair of second wheels of said motor vehicle, and wherein said transfer clutch is operably disposed between said first and third shafts.

16. The power transmission device of claim 1 further including an interaxle differential driven by said first rotary member and having a first output driving a first driveline in a motor vehicle and a second output driving a second driveline in said motor vehicle, and wherein said transfer clutch is operably disposed between said first and second outputs of said interaxle differential.

17. A power transmission device, comprising:
a rotary input member;
a rotary output member;
a transfer clutch operably disposed between said rotary input and output members; and
a clutch actuator for controlling engagement of said transfer clutch, said clutch actuator including an electric motor, a geared drive unit driven by said electric motor, and a clutch operator for converting rotation of said geared drive unit into translation of an actuator member relative to said transfer clutch, said geared drive unit including a pinion gear driven by said electric motor and a face gear meshed with said pinion gear and having a ramp angle accommodating transverse movement of said face gear relative to said pinion gear, said face gear driving said clutch operator for causing translation of said actuator member in response to rotation of said pinion gear.

18. The power transmission device of claim 17 further comprising a control system for actuating said electric motor so as to control the amount and direction of rotation of said face gear for concurrently controlling the amount and direction of translation of said actuator member.

19. The power transmission device of claim 18 wherein said rotary input member provides drive torque to a first driveline of a motor vehicle, wherein said rotary output member is coupled to a second driveline of the motor vehicle.

20. The power transmission device of claim 19 defining a transfer case wherein said rotary input member is a first shaft driving said first driveline and said rotary output member is a second shaft coupled to said second driveline, wherein location of said actuator member in a first position releases engagement of said transfer clutch so as to define a two-wheel drive mode and location of said actuator member in a second position fully engages said transfer clutch so as to define a part-time four-wheel drive mode, and wherein said control system is operable to control activation of said electric motor for varying the position of said actuator member between its first and second positions to controllably vary the drive torque transferred from said first shaft to said second shaft so as to define an on-demand four-wheel drive mode.

21. The power transmission device of claim 19 defining a power take-off unit wherein said rotary input member provides drive torque to a first differential associated with said first driveline, and wherein said rotary output member is coupled to a second differential associated with said second driveline.

22. The power transmission device of claim 17 wherein said clutch operator includes a cam mechanism operable to convert rotation of said face gear into translation of said actuator member relative to said transfer clutch.

23. The power transmission device of claim 22 wherein said cam mechanism includes a first cam member, a second cam member disposed between said first cam member and said actuator member, and a cam surface between said first and second cam members operable to convert relative rotation therebetween into axial translation of said second cam member and said actuator member, and wherein said face gear is fixed for rotation with said second cam member.

24. The power transmission device of claim 23 wherein said second cam member includes a ring segment having a face surface with helical gear teeth formed thereon to define said face gear, and wherein said face surface includes said ramp angle.

25. The power transmission device of claim 17 wherein said rotary input member is a propshaft driven by a drivetrain of a motor vehicle and said rotary output member is a pinion shaft driving a differential associated with an axle assembly of the motor vehicle, and wherein said transfer clutch is disposed between said propshaft and said pinion shaft such that actuation of said clutch actuator is operable to transfer drive torque from said propshaft to said pinion shaft.

26. The power transmission device of claim 17 wherein said rotary input member includes a first differential supplying drive torque to a pair of first wheels in a motor vehicle and a transfer shaft driven by said differential, wherein said rotary output member includes a propshaft coupled to a second differential interconnecting a pair of second wheels in said motor vehicle, and wherein said transfer clutch is disposed between said transfer shaft and said propshaft.

27. The power transmission device of claim 17 further including an interaxle differential driven by said rotary input member and having a first output driving a first driveline in a motor vehicle and a second output driving a second driveline in said motor vehicle, and wherein said transfer clutch is operably disposed between said first and second outputs of said interaxle differential.

28. A torque transfer mechanism for transferring drive torque from a rotary input member to a rotary output member, comprising:
a friction clutch having a clutch pack operably disposed between the input and output members, and an actuator plate moveable between a first position whereat a minimum clutch engagement force is exerted on said clutch pack and a second position whereat a maximum clutch engagement force is exerted on said clutch pack;
a clutch actuator for moving said actuator plate between its first and second positions, said clutch actuator including an electric motor, a pinion gear driven by said electric motor, a face gear meshed with said pinion gear such that said face gear axially translates in response to driven rotation of said pinion gear, and a clutch apply operator for converting rotary movement of said face gear into translational movement of said actuator plate, wherein said face gear includes a ramp angle adapted to compensate for axial movement relative to said pinion gear; and
a control system for actuating said electric motor so as to control rotary movement of said face gear between a first angular position and a second angular position, wherein said face gear is located in a first axial position when said face gear is rotated to its first angular position so as to cause said actuator plate to be located in its first position, and wherein said face gear is located in a second axial position when said face gear is rotated to its second angular position so as to cause said actuator plate to move to its second position.

29. The torque transfer mechanism of claim 28 defining a transfer case wherein the input member is a first shaft driving a first driveline and the output member is a second shaft coupled to a second driveline, wherein location of said actuator plate in its first position releases engagement of said friction clutch so as to define a two-wheel drive mode and location of said actuator plate in its second position fully engages said friction clutch so as to define a part-time four-wheel drive mode, and wherein said control system is operable to control activation of said electric motor for varying the position of said actuator plate between its first and second positions to controllably vary the drive torque transferred from said first shaft to said second shaft so as to define an on-demand four-wheel drive mode.

30. The torque transfer mechanism of claim 28 defining a power take-off unit wherein the input member provides drive torque to a first differential associated with a first driveline, and wherein the output member is coupled to a second differential associated with a second driveline.

31. The torque transfer mechanism of claim 28 wherein the input member is a propshaft driven by a drivetrain of a motor vehicle and the output member is a pinion shaft driving a differential associated with an axle assembly of the motor vehicle, and wherein said friction clutch is disposed between said propshaft and said pinion shaft such that actuation of said clutch actuator operable to transfer drive torque from said propshaft to said pinion shaft.

32. The torque transfer mechanism of claim 28 wherein the input member includes a first differential supplying drive torque to a pair of first wheels in a motor vehicle, and a transfer shaft driven by said first differential, wherein the output member includes a propshaft coupled to a second differential interconnecting a pair of second wheels in the motor vehicle, and wherein said friction clutch is disposed between said transfer shaft and said propshaft.

33. The torque transfer mechanism of claim 28 wherein the input member includes a first shaft supplying drive torque to a second shaft which is coupled to a first differential for driving a pair of first wheels in a motor vehicle, wherein the output member is a third shaft driving a second differential interconnecting a pair of second wheels of the motor vehicle, and wherein said friction clutch is operably disposed between said first and third shafts.

34. A power transmission device, comprising:
a rotary input member adapted to receive drive torque from a power source;
a rotary output member adapted to provide drive torque to an output device;
a friction clutch operably disposed between said rotary input and output members;
a clutch actuator for generating and applying a clutch engagement force to said friction clutch, said clutch actuator including an electric motor, a geared drive unit driven by said electric motor and a clutch operator actuated by said geared drive unit, said geared drive unit including a pinion gear driven by said electric motor and a face gear meshed with said pinion gear such that said face pear can axially translate in response to driven rotation of said pinion gear, said clutch operator including a first cam member and a second cam member that is fixed for rotation and axial translation with said face gear that said second cam member is adapted to move axially relative to said first cam member in response to rotation of said face gear for controllably varying the magnitude of said clutch engagement force applied to said friction clutch; and
a control system for actuating said electric motor for causing said geared drive unit to control the direction and amount of rotation of said face gear.

35. A power transmission device comprising:
first and second rotary members;
a transfer clutch operably disposed between said first and second rotary members; and
a clutch actuator for controlling engagement of said transfer clutch, said clutch actuator including an electric motor, a geared drive unit driven by said electric motor, and a clutch operator for converting rotation of said geared drive unit into translation of an actuator member relative to said transfer clutch, said geared drive unit including a pinion gear driven by said electric motor and meshed with a face gear disposed between said actuator member and said clutch operator, said face gear driving said clutch operator for causing said face gear and said actuator member to axially translate relative to said transfer clutch in response to rotation of said pinion gear.

* * * * *